US008359656B2

(12) United States Patent
Kellerman et al.

(10) Patent No.: US 8,359,656 B2
(45) Date of Patent: *Jan. 22, 2013

(54) MEDIA PROCESSING SYSTEM SUPPORTING DIFFERENT MEDIA FORMATS VIA SERVER-BASED TRANSCODING

(75) Inventors: Marcus Kellerman, San Diego, CA (US); Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/074,097

(22) Filed: Mar. 29, 2011

(65) Prior Publication Data
US 2012/0079600 A1    Mar. 29, 2012

Related U.S. Application Data

(63) Continuation of application No. 11/762,510, filed on Jun. 13, 2007, now Pat. No. 7,917,959, which is a continuation of application No. 10/675,110, filed on Sep. 30, 2003, now Pat. No. 7,296,295.

(60) Provisional (Continued)

(51) Int. Cl.
*G06F 15/16* (2006.01)
*G06F 21/00* (2006.01)
*H04L 29/06* (2006.01)

(52) U.S. Cl. ............................ 726/26; 713/165; 709/246

(58) Field of Classification Search ........................ None
See application file for complete search history.

(56) References Cited

U.S. PATENT DOCUMENTS
(Continued)

FOREIGN PATENT DOCUMENTS
EP        0961490      12/1999
EP        1076459      2/2001
(Continued)

OTHER PUBLICATIONS

Smith, et al., "Transcoding Internet Content for Heterogeneous Client Devices," Circuits and Systems, 1998 ISCAS '98, Proceedings of the 1998 IEEE International Symposium on Monterey, CA, USA, IEEE, US, May 31, 1998, New York, NY, USA, IEEE, US, May 31, 1998 pp. 599-602, XP010289378 ISBN: 0-7803-4455-3.

(Continued)

*Primary Examiner* — Christopher Revak
(74) *Attorney, Agent, or Firm* — Thomas|Horstemeyer, LLP

(57) ABSTRACT

A method for processing media content includes receiving, at a second communications device communicatively coupled to a network at a first geographic location, from a first wireless mobile communications device communicatively coupled to the second communications device at the first geographic location, a device profile of the first wireless mobile communications device. The device profile received from the first wireless mobile communications device and media content may be sent to a server communicatively coupled to the network at a second geographic location. Media content may be received from the server, where the media content has been reformatted based on the device profile. The reformatted media content may be transmitted to the first wireless mobile communications device. The received device profile of the first wireless mobile communication device may be stored.

44 Claims, 13 Drawing Sheets

Related U.S. Application Data application No. 60/470,960, filed on May 15, 2003, provisional application No. 60/443,897, filed on Jan. 30, 2003, provisional application No. 60/444,099, filed on Jan. 30, 2003, provisional application No. 60/443,996, filed on Jan. 30, 2003, provisional application No. 60/444,243, filed on Jan. 30, 2003, provisional application No. 60/464,711, filed on Apr. 23, 2003, provisional application No. 60/457,179, filed on Mar. 25, 2003, provisional application No. 60/467,867, filed on May 5, 2003, provisional application No. 60/467,990, filed on May 5, 2003, provisional application No. 60/432,472, filed on Dec. 11, 2002, provisional application No. 60/443,894, filed on Jan. 30, 2003.

U.S. PATENT DOCUMENTS

| Patent No. | Date | Inventor |
|---|---|---|
| 6,407,680 B1 | 6/2002 | Lai et al. |
| 6,463,445 B1 | 10/2002 | Suzuki et al. |
| 6,490,627 B1 | 12/2002 | Kaira et al. |
| 6,721,802 B1 | 4/2004 | Wright et al. |
| 6,856,970 B1 | 2/2005 | Campbell et al. |
| 7,010,581 B2 | 3/2006 | Brown et al. |
| 7,062,547 B2 | 6/2006 | Brown et al. |
| 7,296,295 B2 | 11/2007 | Kellerman et al. |
| 7,802,308 B2 * | 9/2010 | Kellerman et al. ............. 726/26 |
| 7,917,959 B2 * | 3/2011 | Kellerman et al. ............. 726/26 |
| 2002/0087549 A1 | 7/2002 | Mostafa |
| 2005/0283791 A1 | 12/2005 | McCarthy et al. |
| 2007/0239855 A1 | 10/2007 | Kellerman et al. |
| 2007/0282959 A1 | 12/2007 | Stern |
| 2008/0175325 A1 | 7/2008 | Hannuksela et al. |
| 2009/0006643 A1 | 1/2009 | Lee |
| 2009/0061900 A1 | 3/2009 | Yasrebi et al. |
| 2010/0063989 A1 * | 3/2010 | Mehta et al. ................... 709/202 |
| 2010/0070753 A1 * | 3/2010 | Kido et al. ..................... 713/150 |
| 2011/0040894 A1 * | 2/2011 | Shrum et al. ................... 709/246 |
| 2011/0196914 A1 * | 8/2011 | Tribbett ........................ 709/203 |
| 2012/0086851 A1 * | 4/2012 | Shrum et al. ................... 348/441 |
| 2012/0088470 A1 * | 4/2012 | Raleigh ........................ 455/406 |
| 2012/0089845 A1 * | 4/2012 | Raleigh ........................ 713/176 |
| 2012/0090020 A1 * | 4/2012 | Shrum et al. ..................... 726/5 |
| 2012/0134291 A1 * | 5/2012 | Raleigh ........................ 370/252 |

FOREIGN PATENT DOCUMENTS

| | | |
|---|---|---|
| WO | 01/46818 | 6/2001 |

OTHER PUBLICATIONS

European Search Report of European Application No. 04006742.3.

\* cited by examiner

| CHANNEL LINE UP | HOUR, DAY | | | | |
|---|---|---|---|---|---|
| | <<1PM | 2PM | ... | 6PM | 7PM>> |
| FAMILY VACATIONS | | | | | |
| KID's SPORTS | | | | | |
| ... | | | | | |
| VACATION in ALASKA VIDEO  802 | Normal Estimated Delivery Time: 2 hrs 13 min Cost: 59¢ (without Queuing) | | Showing All Day (48 Min), Earliest Order Time: 4:00PM MPEG-2 1.5 Mbps | | |
| VACATION in ALASKA VIDEO  803 | Express Estimated Delivery Time: 18 min Cost: $1.2 (with Queuing) | | Showing All Day (48 Min), Earliest Order Time: 4:00PM MPEG-2 4 Mbps | | |
| VACATION in ALASKA VIDEO  804 | Overnight Delivery: Avail Nxt Morning Cost: 5¢ (Server Stored) | | Showing All Day (48 Min), Earliest Order Time: 4:00PM MPEG-2 19 Mbps | | |

MEDIA PROCESSING SYSTEM SUPPORTING DIFFERENT MEDIA FORMATS VIA SERVER-BASED TRANSCODING

CROSS-REFERENCE TO RELATED APPLICATIONS/INCORPORATION BY REFERENCE

This application is a continuation of U.S. patent application Ser. No. 11/762,510 now U.S. Pat. No. 7,917,959 filed Jun. 13, 2007, which is a continuation of U.S. patent application Ser. No. 10/675,110 filed Sep. 30, 2003, now U.S. Pat. No. 7,296,295, which makes reference to, claims priority to and claims benefit from U.S. Patent Application Ser. No. 60/470,960, entitled "Media Processing System Supporting Different Media Formats via Server-Based Transcoding" and filed on May 15, 2003; U.S. Patent Application Ser. No. 60/443,897, entitled "Media Processing System Providing Access to Distributed Media via a Channel Guide" and filed on Jan. 30, 2003; U.S. Patent Application Ser. No. 60/444,099, entitled "Media Channel Setup in a Media Exchange Network" and filed on Jan. 30, 2003; U.S. Patent Application Ser. No. 60/443,996, entitled "Media Processing System Automatically Offering Access to Newly Available Media in a Media Exchange Network" and filed on Jan. 30, 2003; U.S. Patent Application Ser. No. 60/444,243, entitled "Migration of Stored Media Through a Media Exchange Network" and filed on Jan. 30, 2003; U.S. Patent Application Ser. No. 60/464,711, entitled "Automated Routing and Consumption of Media Through a Media Exchange Network" and filed on Apr. 23, 2003; U.S. Patent Application Ser. No. 60/457,179, entitled "Server Architecture Supporting a Personal Media Exchange Network" and filed on Mar. 25, 2003; U.S. Patent Application Ser. No. 60/467,867, entitled "Billing Support in a Media Exchange Network" and filed on May 5, 2003; U.S. Patent Application Ser. No. 60/467,990, entitled "Media Processing System Supporting Adaptive Digital Media Parameters Based On End-User Viewing Capabilities" and filed on May 5, 2003; U.S. Patent Application Ser. No. 60/432,472, entitled "Personal Inter-Home Media Exchange Network" and filed on Dec. 11, 2002; and U.S. Patent Application Ser. No. 60/443,894, entitled "Access and Control of Media Peripherals Via a Media Processing System" and filed on Jan. 30, 2003. The complete subject matter of the above-identified applications are hereby incorporated herein by reference in their entirety.

In addition, this application makes reference to U.S. Patent Application Ser. No. 60/457,179, entitled "Server Architecture Supporting A Personal Media Exchange Network" and filed Mar. 25, 2003; U.S. patent application Ser. No. 10/657,390, entitled "Personal Inter-Home Media Exchange Network" and filed on Sep. 8, 2003; and U.S. patent application Ser. No. 10/660,267, entitled "Personal Access and Control of Media Peripherals on a Media Exchange Network" and filed on Sep. 11, 2003. The complete subject matter of the above-identified applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Today, files having different formats for images, video, and audio may be attached to e-mail messages using a PC (personal computer) and sent to other PC's via the Internet. Also, files may be sent from one location to another over a network such as a local area network (LAN) or a wide area network (WAN) using a file transfer protocol (FTP). The files may be used in conjunction with certain media players such as PC's, DVD players, PDA's, MP3 players, etc.

The format (e.g., MPEG, JPEG, Windows Media, Quick Time, DVD sound format, AC3, CD format, etc.) of the files define their compatibility with devices. Files are often sent from a source location to a destination location without the source having any knowledge of the format capabilities of devices at the destination location.

For example, a source PC may send a JPEG image file to a destination PC without knowing what the file format capabilities are of the destination PC. The source PC may send the JPEG file to a destination PC. If the destination PC only supports TIFF format capability, then the destination PC may not be able to process and display the JPEG formatted file.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in, for example, systems and methods that reformat media content. In one embodiment, a system may include, for example, a server, a first communications device and a second communications device. The server, the first communications device and the second communications device may be operatively coupled to a network. The second communications device may receive, from the first communications device, a device profile relating to the first communications device and may send the device profile and media content to the server. The server may reformat the media content based on the device profile.

In another embodiment, a system may include, for example, a server, a first communications device and a second communications device. The server, the first communications device and the second communications device may be operatively coupled to a network. The first communications device may send a device profile of the first communications device to the server. The second communications device may send media content to the server. The server may reformat the media content based on the device profile.

In another embodiment, a system may include, for example, a server and a communications device. The server and the communications device may be operatively coupled to a network. The communications device may receive media content of a format that is not supported by the communications device. The communications device may send a device profile of the communications device and the received media content to the server. The server may reformat the media content from the communications device into a format that is supported by the communications device based on the device profile.

In another embodiment, a system may include, for example, a communications device operatively coupled to a network. The communications device may store a revisable device profile of the communications device, send the revisable device profile to the network, and receive, from the network, media content that has been reformatted based on the device profile.

In another embodiment, a method may include, for example, one or more of the following: receiving, by a server, a device profile of a communications device and media content destined for the communications device, the server being operatively coupled to the communications device via a network; and reformatting, by the server, the media content based on the device profile.

These and other advantages, aspects and novel features of the present invention, as well as details of some illustrated embodiments thereof, will be more fully understood from the following description and drawings.

BRIEF DESCRIPTION OF THE DRAWINGS

FIG. 8 illustrates an embodiment of a TV guide channel user interface showing several options of a pushed media according to the present invention.

DETAILED DESCRIPTION OF THE INVENTION

Figure 1:
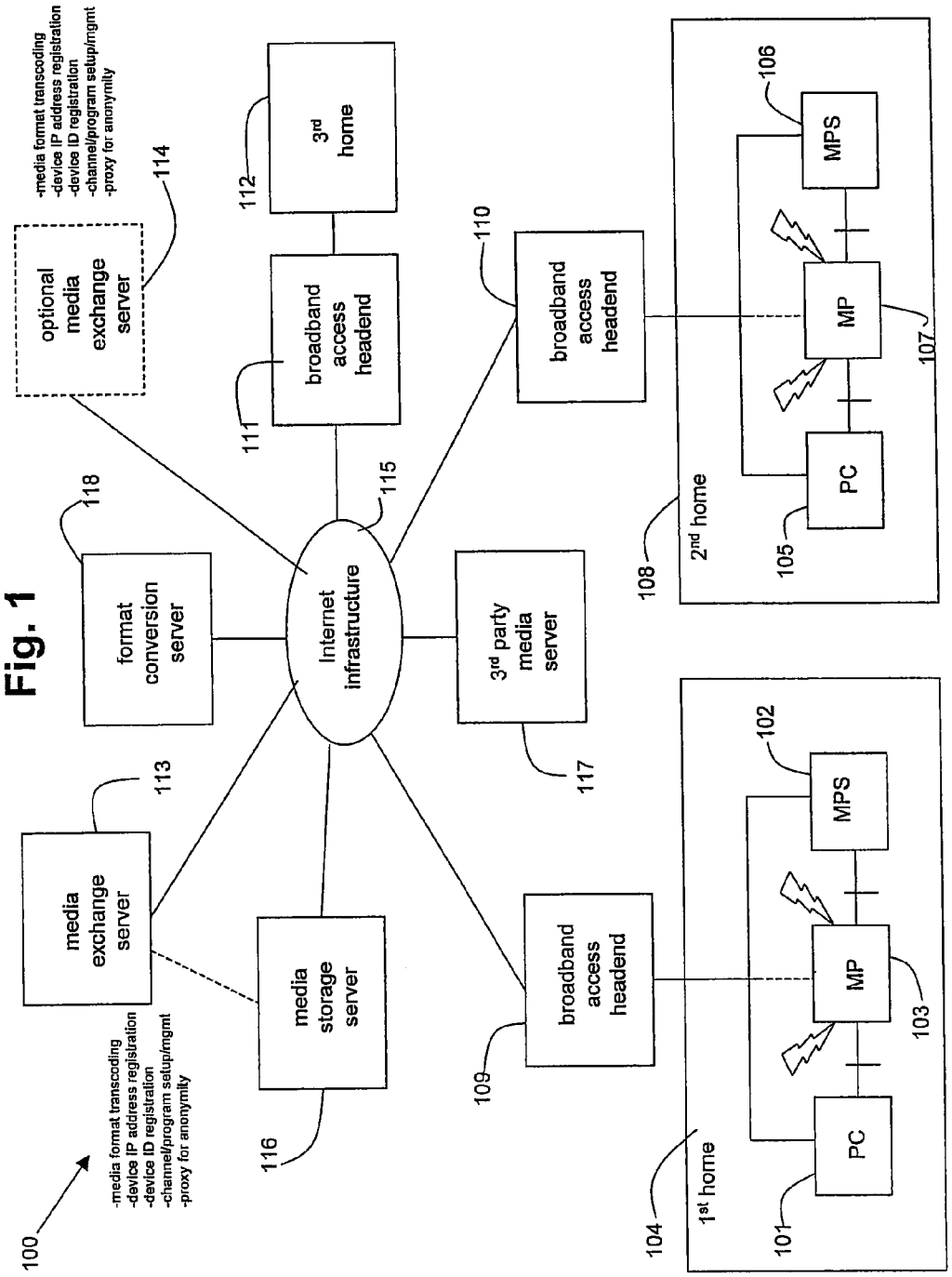
FIG. 1 is a diagram illustrating an embodiment of a media exchange network comprising an architecture to support different media formats via server-based transcoding according to the present invention.

FIG. 1 is a diagram illustrating an embodiment of a media exchange network 100 comprising an architecture to support different media formats via server-based transcoding according to the present invention. Some examples of video formats include the MPEG family of video formats, the Windows media formats, the Real-Player format, the Quick-Time video format, the H.263 video format, the H.323 video format, and other new or existing video formats. Some examples of image formats include JPEG, TIFF, bit map, GIF, and PCX, and any other new or existing image formats. Some examples of audio formats include MP3, CD, AC-3, Dolby, multi-channel 51, and any other new or existing audio formats.

The media exchange network 100 may include a communication network comprising, for example, a personal computer (PC) 101, a media processing system (MPS) 102, and at least one media peripheral (MP) 103 at a $1^{st}$ home 104; a PC 105, an MPS 106, and at least one MP 107 at a $2^{nd}$ home 108. The MP 103 may interface to the PC 101 and/or the MPS 102 via, for example, a wireless link or a wired link (e.g., a USB connection). The PC 101 and the MPS 102 may interface to a broadband access headend 109. The broadband access headend 109 may comprise, for example, a cable headend, a satellite headend, or a DSL headend in accordance with various embodiments of the present invention. As an option, the MP 103 may interface with the broadband access headend 109. The PC 101, the MPS 102, and/or the MP 103 may include, for example, internal modems (e.g., a cable modem or a digital subscriber line (DSL) modem) or other interface devices to communicate with the broadband access headend 109. Optionally, the interface device (e.g., a modem) may be external to the PC 101, MPS 102, and MP 103.

Similarly, the MP 107 may interface to the PC 105 and/or the MPS 106 via, for example, a wireless link or a wired link (e.g., a USB connection). The PC 105 and the MPS 106 may interface to a broadband access headend 110. The broadband access headend 110 may comprise, for example, a cable headend, a satellite headend, or a DSL headend in accordance with various embodiments of the present invention. As an option, the MP 107 may interface with the broadband access headend 110. The PC 105, the MPS 106, and/or the MP 107 may include, for example, internal modems (e.g., a cable modem or a DSL modem) or other interface device to communicate with the broadband access headend 110. Optionally, the interface device (e.g., modem) may be external to the PC 105, the MPS 106, and the MP 107.

The media exchange network 100 may further comprise, for example, a broadband access headend 111 connected between a $3^{rd}$ home 112 and an Internet infrastructure 115, a media exchange server 113 (e.g., as in the case of a single central server supporting the media exchange network 100) and, optionally, at least one other media exchange server 114 (e.g., as in the case of a multiple server architecture) supporting the media exchange network 100 connected to the Internet infrastructure 115. In accordance with an embodiment of the present invention, the media exchange network 100 may comprise two or more media exchange servers strategically located at various points in the media exchange network 100. Also, the media exchange network 100 may include a format conversion server 118, dedicated to converting the formats of media on the media exchange network 100 and interfacing to the Internet infrastructure 115.

The broadband access headends 109 and 110 may also interface to the Internet infrastructure 115. The broadband access headend 111 may comprise, for example, a cable headend, a satellite headend, or a DSL headend in accordance with various embodiments of the present invention. The $3^{rd}$ home 112 may also include, for example, a PC, an MPS, and/or an MP as part of the media exchange network 100.

The media exchange network 100 may also comprise, for example, a media storage server 116 and a 3$^{rd}$ party media server 117, both interfacing to the Internet infrastructure 115. The media storage server 116 may interact with the media exchange server 113 and may provide temporary and/or archival storage for digital media on the media exchange network 100. For example, the media storage server 116 may temporarily hold media files that are addressed to certain MPS's and/or PC's on the media exchange network 100.

The 3$^{rd}$ party media server 117 may store, for example, movies, video, user profiles, and other digital media that may be provided to users of the media exchange network 100.

In accordance with various embodiments of the present invention, an MPS may comprise, for example, at least one of a set-top box, a PC and a TV with a media management system (MMS). An MMS is also known herein as a media exchange software (MES) platform.

In accordance with various embodiments of the present invention, an MMS may comprise a software platform operating on at least one processor to provide certain functionality including, for example, user interface functionality, distributed storage functionality and networking functionality. For example, an MMS may provide control of media peripheral devices, status monitoring of media peripheral devices and inter-home MPS routing selection in accordance with an embodiment of the present invention.

In accordance with an embodiment of the present invention, a broadband access headend may be upgraded to a media exchange headend by adding functionality to facilitate the exchange of media on the media exchange network in conjunction with the media exchange server. Such functionality may include, for example, distributed networking capability, digital media transcoding, archival functionality (e.g., long term media storage), temporary storage (e.g., to aid in the distribution and routing of media), storage management, and digital rights management.

The media exchange network 100 may support, for example, the re-formatting (e.g., transcoding) of media content based on device capabilities of an end-user on the media exchange network 100. In accordance with an embodiment of the present invention, the media exchange servers 113 and 114 may provide at least some of the functionality on the media exchange network 100 including, for example, digital media transcoding, billing and payment, device registration, channel/program setup and management, and security. In accordance with an embodiment of the present invention, the format conversion server 118 may provide the functionality of digital media transcoding.

The various elements of the media exchange network 100 may include, for example, storage locations for digital media and data. The storage locations may comprise, for example, hard disk drives, a DVD player, a CD player, floppy disk drives, a RAM, or any combination of these. The storage locations may also include, for example, memory sticks, PCMCIA cards, compact flash cards, or any combination of these.

The PC's 101 and 105 may comprise, for example, desktop PC's, notebook PC's, PDA's, or any computing device.

In accordance with some embodiments of the present invention, the MPS's 102 and 106 may comprise enhanced set-top boxes. The MPS 102 and/or the MPS 106 may comprise, for example, a TV screen for viewing and interacting with various user interfaces, media, data, and services that are available on the media exchange network using, for example, a remote control. The PC 101 and the PC 105 may comprise, for example, a PC monitor for viewing and interacting with various user interfaces, media, data, and services that are available on the media exchange network using, for example, a keyboard and a mouse. The MPS's, the PC's, and/or the MP's may include, for example, functional software to support interaction with the various elements of the media exchange network 100 in accordance with various embodiments of the present invention.

The media peripherals 103 and 107 of the media exchange network 100 may include, for example, a digital camera, a digital camcorder, an MP3 player, a home juke-box system, a personal digital assistant (PDA), a multi-media gateway device, and various home appliances.

Other embodiments of the present invention may comprise various combinations and/or multiple instantiations of the elements of FIG. 1 according to the present invention.

End-user devices (e.g., a PDA, an MPS with a TV display, a PC with a monitor, etc.) may support different media formats such as, for example, JPEG, MPEG-II, MPEG-IV, JPEG, MP3, digital Dolby, etc. Media content transferred across a media exchange network may include, for example, images, video, and audio having different digital media formats that support different types of encoding. In a media exchange network, media content may be transferred from one user to another in a channelized manner. The media content may be incorporated into a channel format and the contents of the channel may be pushed from one user to another via the media exchange network.

In accordance with an embodiment of the present invention, a source device (e.g., a PC or an MPS) on a media exchange network may have knowledge of the device capabilities of an end-user or a destination device (e.g., a PC or an MPS) and may ensure that the format of media content sent from the source device to the end-user is consistent with the device capabilities of the end-user. For example, an MPS of a first end-user on a media exchange network may support an MPEG-II video format. An MPS of a second end-user on the media exchange network may support the Windows Media format. A PC of a third end-user on the media exchange network may only support the JPEG image format.

Figure 2A:
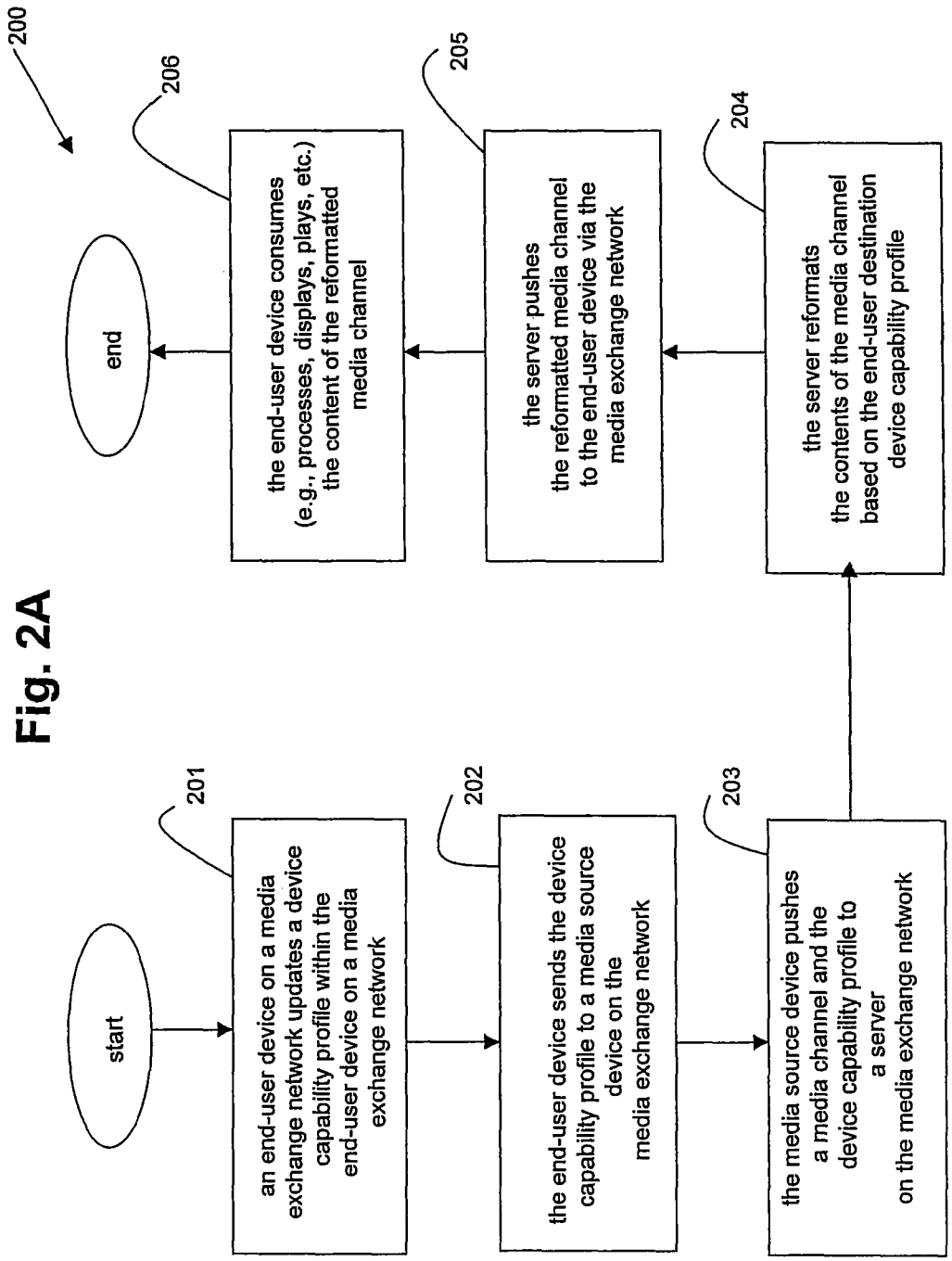
FIG. 2A is a flowchart illustrating an embodiment of a method that transcodes media content formats based on end-user media format capabilities on a media exchange network according to the present invention.

FIG. 2A is a flowchart illustrating an embodiment of a method 200 that transcodes media content formats based on end-user media format capabilities on the media exchange network 100 according to the present invention. In step 201, an end-user device on a media exchange network updates a device capability profile within the end-user device on a media exchange network. In step 202, the end-user device sends the device capability profile to a media source device on the media exchange network. In step 203, the media source device pushes a media channel and the device capability profile to a server on the media exchange network. In step 204, the server reformats (e.g., transcodes) the content of the media channel based on the end-user destination device capability profile. In step 205, the server pushes the reformatted media channel to the end-user device via the media exchange network. In step 206, the end-user device consumes (e.g., processes, displays, plays, etc.) the content of the reformatted media channel.

In accordance with an embodiment of the present invention, a device capability profile may include device format information corresponding to various devices of a user on the media exchange network.

As an example, referring to FIG. 1, a user at the 2$^{nd}$ home 108 has just upgraded the MPS 106 to handle the MPEG-IV video format. The user at the 2$^{nd}$ home 108 updates a device capability profile stored in the MPS 106 to indicate the new MPEG-IV capability of the MPS 106. The MPS 106 then automatically sends the updated device capability profile to the MPS 102 at the 1$^{st}$ home 104 over the media exchange network 100. The user of the MPS 102 at the 1$^{st}$ home 104 desires to send a channel including a digital video file to the user at the 2$^{nd}$ home 108. The MPS 102 sends the channel of digital video, which is in a Windows Media format, to the media exchange server 113 along with the device capability profile of the MPS 106. The media exchange server re-formats (e.g., transcodes) the channel of digital video from the Windows Media format to the MPEG-IV format and pushes the transcoded channel to the MPS 106 via the media exchange network 100. The user of the MPS 106 may view the digital video in the MPEG-IV format.

In another embodiment of the present invention, the MPS 106 may send the device capability profile directly to the media exchange server 113 instead of to the individual user of the MPS 102. As a result, any user wanting to push digital video to the MPS 106 may send the digital video content to the media exchange server 113 in any format and the media exchange server 113 will know to convert the digital video content to the MPEG-IV format, for example.

Figure 2B:
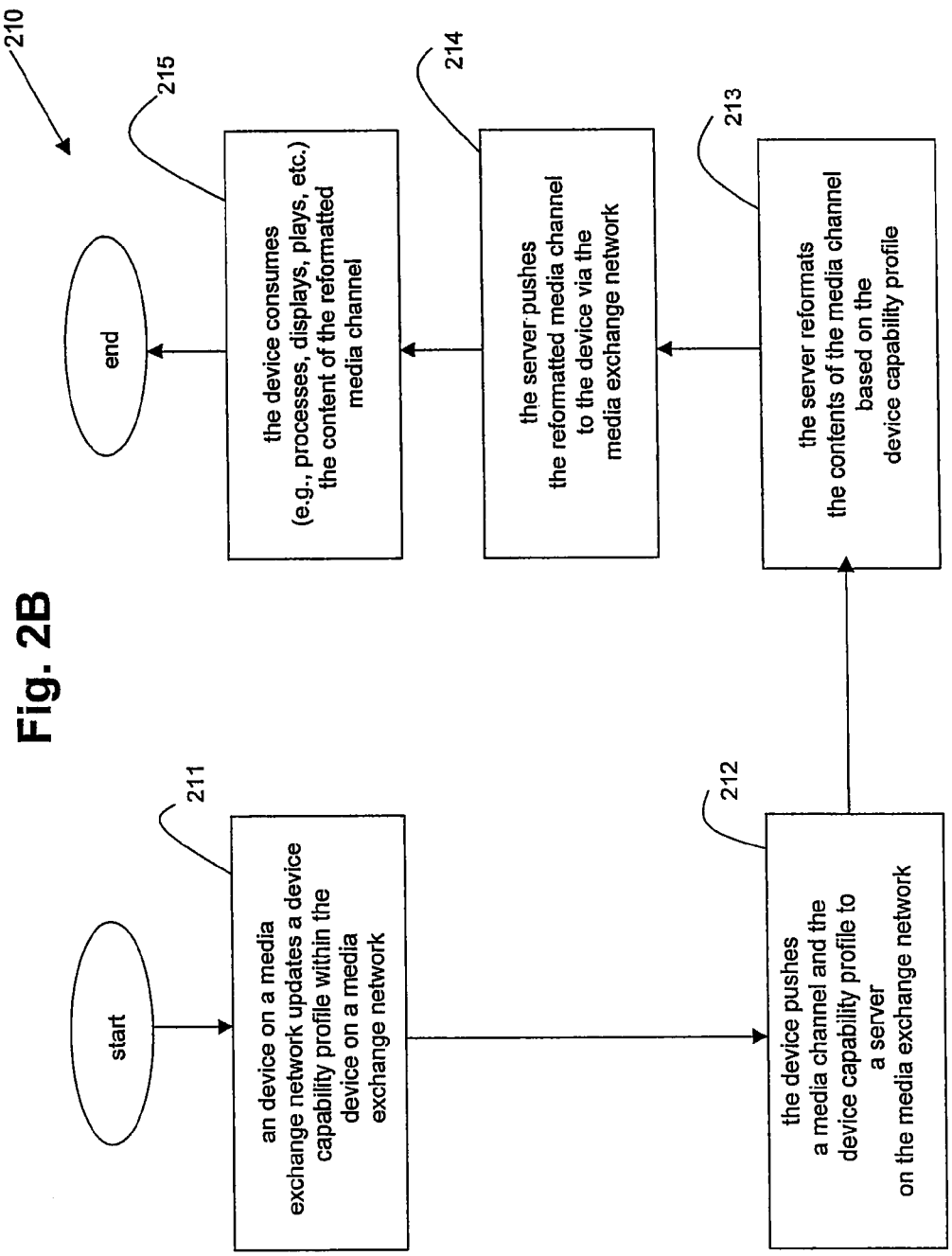
FIG. 2B is a flowchart illustrating an embodiment of a method that transcodes media content formats based on end-user media format capabilities on a media exchange network according to the present invention.

FIG. 2B is a flowchart illustrating an embodiment of a method 210 that transcodes media content formats based on end-user media format capabilities on the media exchange network 100 according to the present invention. In step 211, a device on a media exchange network updates a device capability profile within the device on the media exchange network. In step 212, the device pushes a media channel and the device capability profile to a server on the media exchange network. In step 213, the server reformats the contents of the media channel based on the device capability profile. In step 214, the server pushes the reformatted media channel to the device via the media exchange network. In step 215, the device consumes (e.g., processes, displays, plays, etc.) the content of the reformatted media channel.

As an example, referring to FIG. 1, a user at the 1st home 104 has just upgraded the PC 101 to handle the AC3 audio format. The user at the 1$^{st}$ home 104 updates a device capability profile stored in the PC 101 to indicate the new AC3 capability of the PC 101. The PC 101 then sends the updated device capability profile and a channel of digital audio, which is in an MP3 format, to the format conversion server 118. The format conversion server 118 re-formats (e.g., transcodes) the channel of digital audio from the MP3 format to the AC3 format and pushes the transcoded channel back to the PC 101 via the media exchange network 100. The PC 101 may now play the digital video in the AC3 format.

As another example, a user at the 2$^{nd}$ home 108 may bring home an MP 107 (e.g., a digital camera). However, the digital camera 107 may not be directly compatible with the MPS 106 since the digital camera 107 stores images in a JPEG format and the MPS 106 only processes digital images that are in a GIF format. As a result, when JPEG images are downloaded from the digital camera 107 to the MPS 106, the MPS 106 may push the JPEG images to the format conversion server 118 on the media exchange network to have the JPEG images converted to the GIF format. The format conversion server 118, after converting the images, pushes the images in the GIF format back to the MPS 106. The MPS 106 may now process and display the images in the GIF format.

In accordance with various embodiments of the present invention, if an end-user changes a device (e.g., a PC, an MPS, an MP) on the media exchange network, then the end-user may manually update a corresponding device capability profile or the device capability profile may be automatically updated once the device is connected to the media exchange network. The updated device capability profile may then be manually or automatically sent to other users on the media exchange network such as friends and family members, for example, or to a media exchange network.

In accordance with various embodiments of the present invention, the reformatting of files of media content may be performed by an MPS or a PC on the media exchange network. If a media file is to be transferred from a source device to an end-user device, then the source device may have the capability to reformat the media file based on a device capability profile of the destination device.

Some embodiments according to the present invention may transfer and share many different types of digital media, data, and services between one device/location and another with ease while being able to index, manage, and store the digital media and data.

For example, it may be desirable to be able to distribute and to store many types of digital media in a PC and/or a television environment in a user-friendly manner without using many different types of software applications and/or unique and dedicated interfaces. Any networking issues or other technical issues may be transparent to the users. It may also be desirable to use existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, via a TV channel guide look-and-feel user interface. The media exchange network also allows a user to construct personal media channels that comprise his personal digital media (e.g., captured digital pictures, digital video, digital audio, etc.), request that third-party media channels be constructed from third-party digital media, and access the media channels pushed to the user by other users on the media exchange network.

PC's may be used but are not required to interface to the media exchange network for the purpose of exchanging digital media, data, and services. Set-top-boxes or integrated MPS's may be used with the media exchange network to perform some or all of the previously described media exchange functions using, for example, a remote control with a television screen.

Set-top-boxes may be software enhanced to create an MPS that provides full media exchange network interfacing and functionality via a TV screen with a TV guide look-and-feel. PC's may be software enhanced and may provide the same TV guide look-and-feel. Therefore, the media exchange network may support both PC's and MPS's in a similar manner. In accordance with an embodiment of the present invention, a fully integrated MPS may be designed from the ground up, having full MPS capability.

In the case of an MPS configuration, the user may use a remote control and a TV may use a keyboard and/or a mouse to access the media exchange network.

An MPS or an enhanced PC may provide, for example, a storage and distribution platform for the exchange of personal and third party digital media, data, and services as well as for bringing the conventional television channels to a user's home. An MPS and/or a PC may connect to the media exchange network via an existing communication infrastructure which may include, for example, a cable infrastructure, a DSL infrastructure, a satellite infrastructure, etc. The connection to the communication infrastructure may be hard-wired or wireless.

The media exchange network may allow users to effectively become their own broadcasters from their own homes by creating their own media channels and pushing those media channels to other authorized users on the media exchange network, such as friends and family members.

Figure 3:
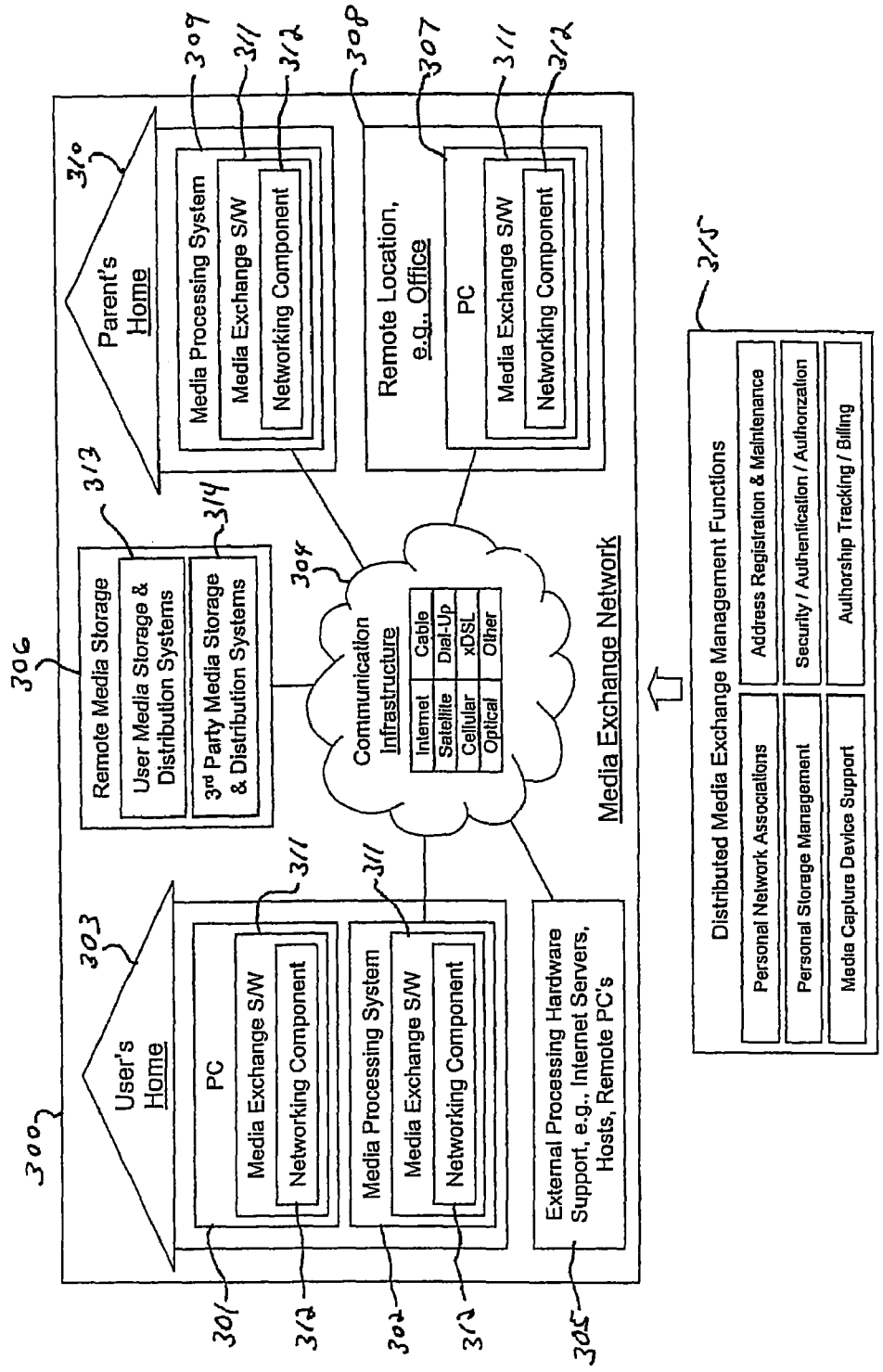
FIG. 3 is a schematic block diagram illustrating an embodiment of a media exchange network according to the present invention.

FIG. 3 illustrates a media exchange network 300 for exchanging and sharing digital media, data, and services in accordance with an embodiment of the present invention. The media exchange network 300 may comprise, for example, a secure, closed network environment that is only accessible to pre-defined users and service providers. The media exchange network of FIG. 3 comprises a first PC 301 and a first MPS 302 at a user's home 303, a communication infrastructure 304, an external processing hardware support 305, a remote media storage 306, a second PC 307 at a remote location 308 such as an office, and a second MPS 309 at a parent's home 310.

The PC's 301 and 307 and the MPS's 302 and 309 may each include a media exchange software (MES) platform 311 and a networking component 312 for connectivity. The MES platform 311 provides multiple capabilities including, for example, media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 may comprise, for example, at least one server such as a centralized Internet server, a peer-to-peer server, or a cable headend. The server may alternatively be distributed over various hosts or remote PC's. The MES platform 311 may reside on the external processing hardware support server 305. The remote media storage 306 may comprise, for example, user media storage and distribution systems 313 and/or third party media storage and distribution systems 314.

The communication infrastructure 304 may comprise, for example, at least one of an Internet infrastructure, a satellite infrastructure, a cable infrastructure, a dial-up infrastructure, a cellular infrastructure, an xDSL infrastructure, an optical infrastructure, or some other infrastructure. The communication infrastructure 304 may link the user's home 303, the parent's home 310, the remote media storage 306, and the remote location office 308 to each other (e.g., the communication infrastructure 304 may link all users and service providers of the media exchange network 300).

The various functions 315 of the media exchange network 300 may comprise, for example, generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated into the PC 301 at the user's home 303.

Figure 4:
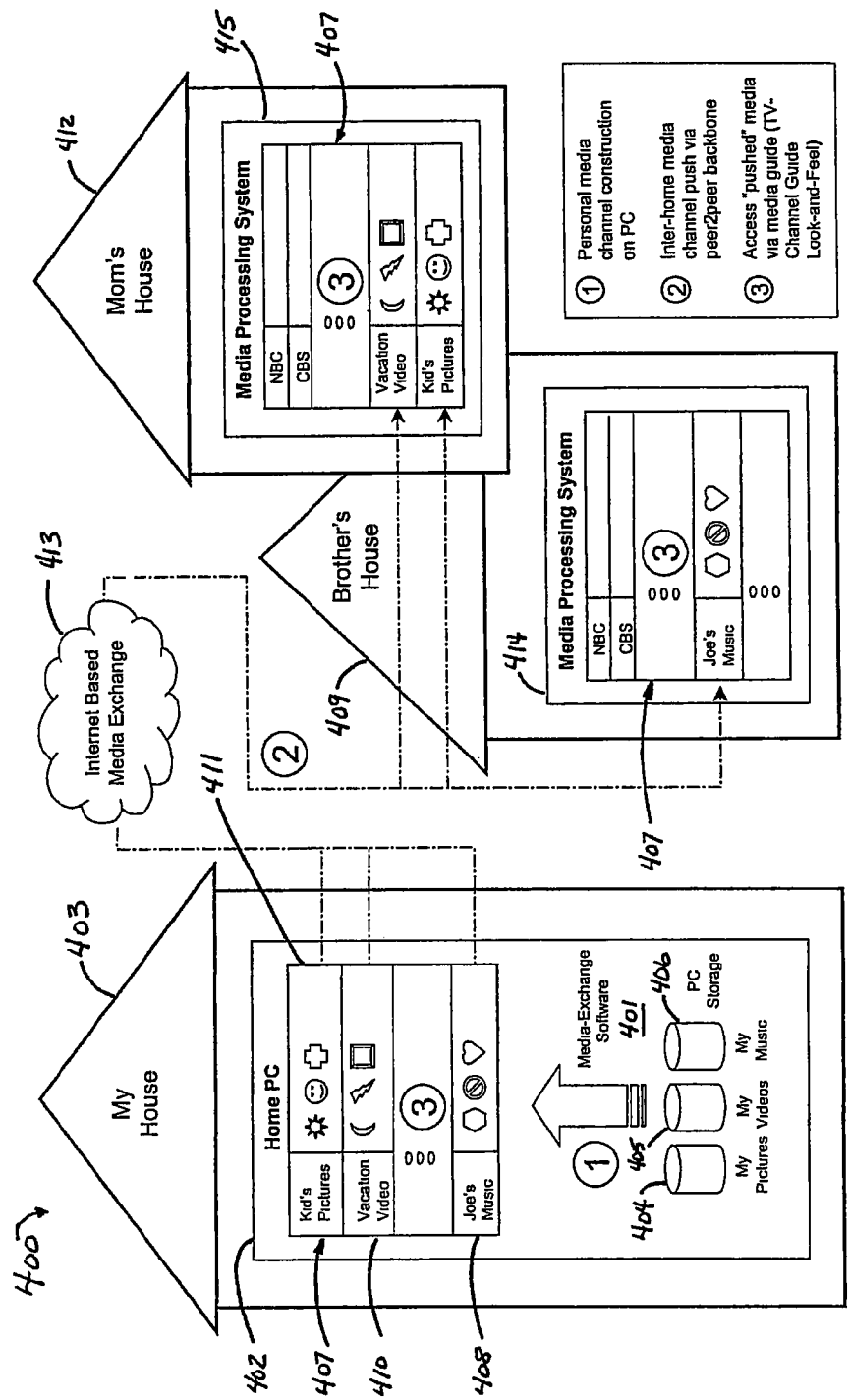
FIG. 4 is a schematic block diagram illustrating an exchange of personal media over a media exchange network according to an embodiment of the present invention.

FIG. 4 illustrates an example of a personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the Internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
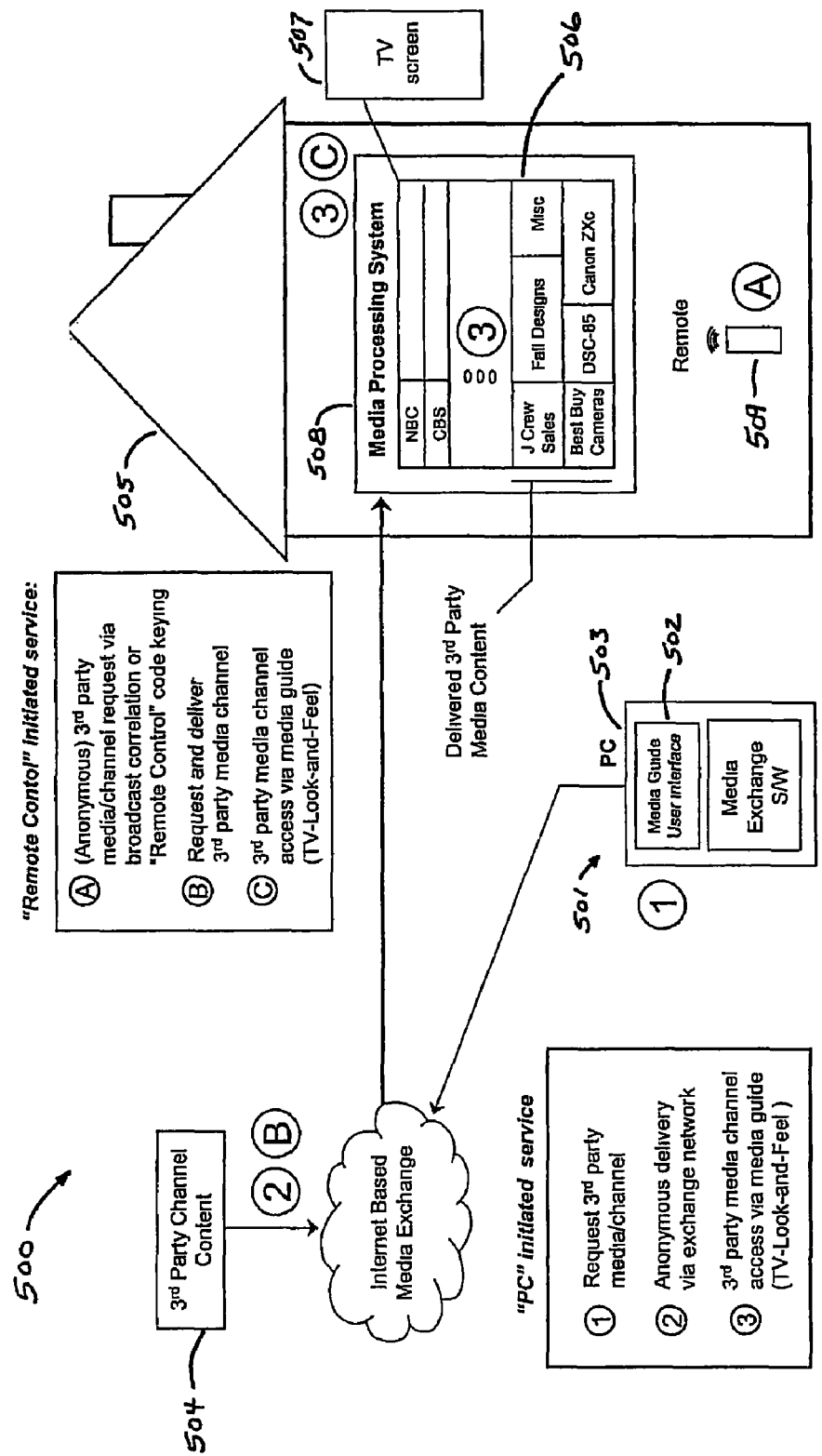
FIG. 5 is a schematic block diagram illustrating an exchange of third-party media over a media exchange network according to an embodiment of the present invention.

FIG. 5 illustrates an example of a third-party media exchange over a media exchange network 500 in accordance with an embodiment of the present invention. In step 1, a PC-initiated third-party request is made by a first party 501 via an Internet-based media exchange network 500 using a TV channel guide look-and-feel user interface 502 on a PC 503. In step 2, an anonymous delivery of the requested third-party channel 504 is made to a second party 505 via the Internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an Internet-based media exchange network 500 using a TV channel guide look-and-feel user interface 506 on a TV screen 507 using a remote control 509. The second party 505 may key in a code, using the remote control 509, that is correlated to a commercial or some other third party broadcast media. In step B, an anonymous delivery of the requested third-party channel 504 is made to a first party 501 via the Internet-based media exchange network 500. In step C, the first party 501 accesses the third-party channel 504 using a TV channel guide look-and-feel user interface 502 on a PC 503.

Figure 6:
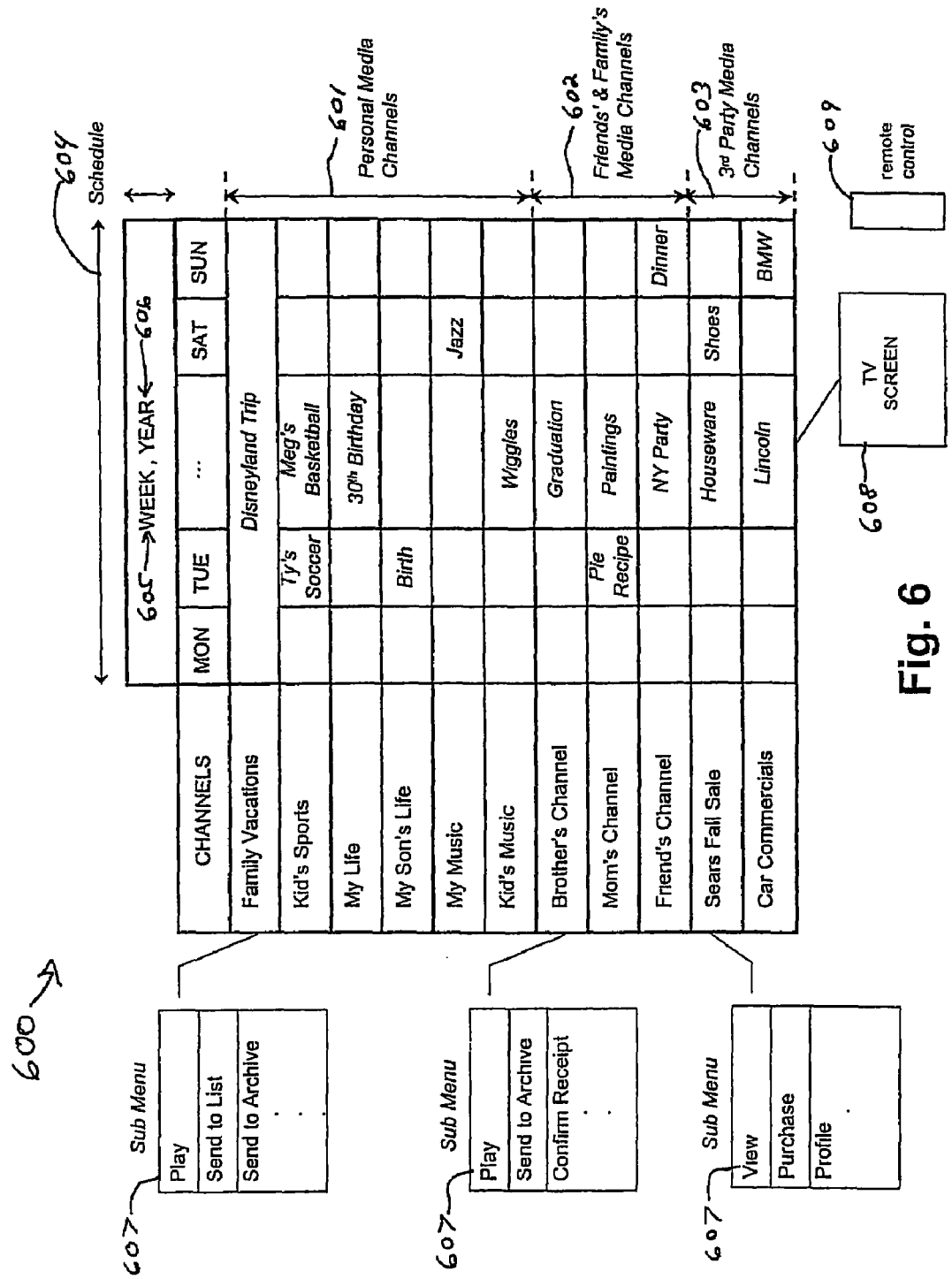
FIG. 6 illustrates an embodiment of a television (TV) guide channel user interface according to the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or a mouse.

The TV channel guide user interface 600 may be configured not only for conventional TV channels, but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as, for example, "play", "send to list", "send to archive", "confirm receipt", "view", "purchase", and "profile".

Figure 7:
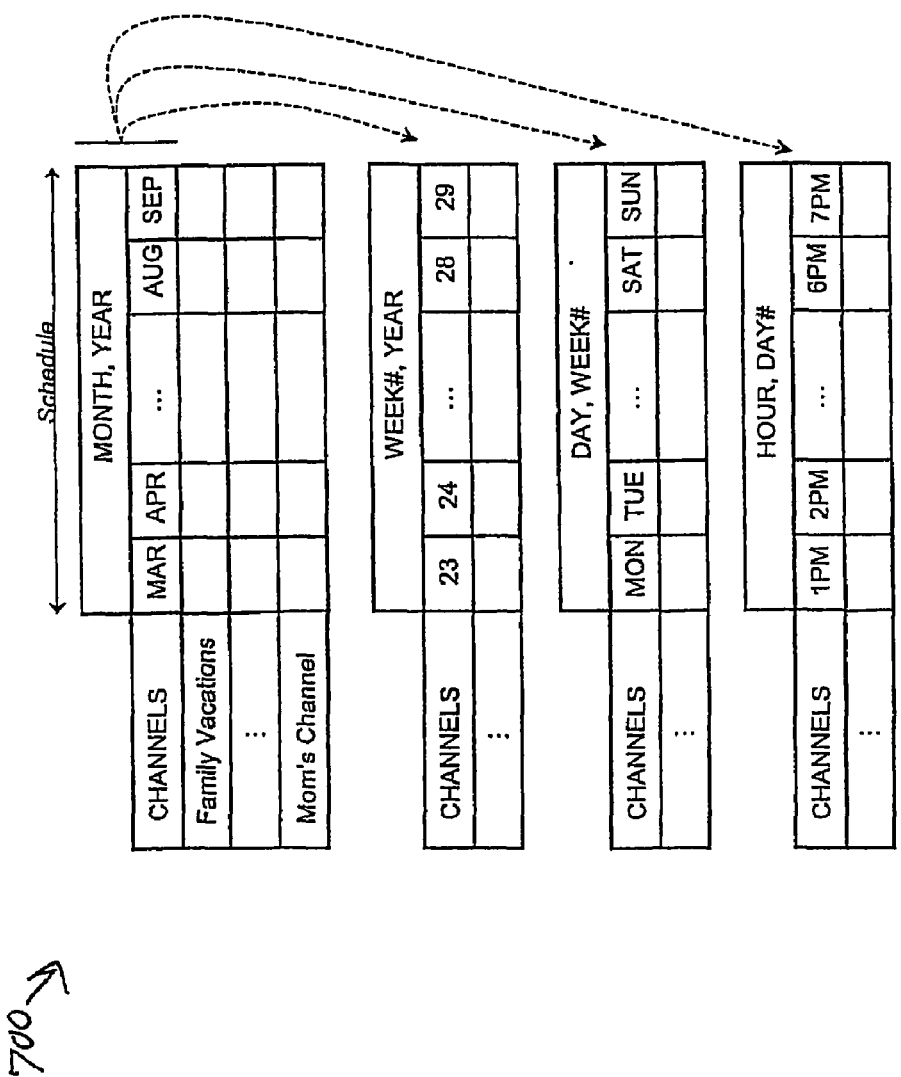
FIG. 7 illustrates an embodiment of a TV guide channel user interface according to the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for accepting and downloading the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing may comprise, for example, buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
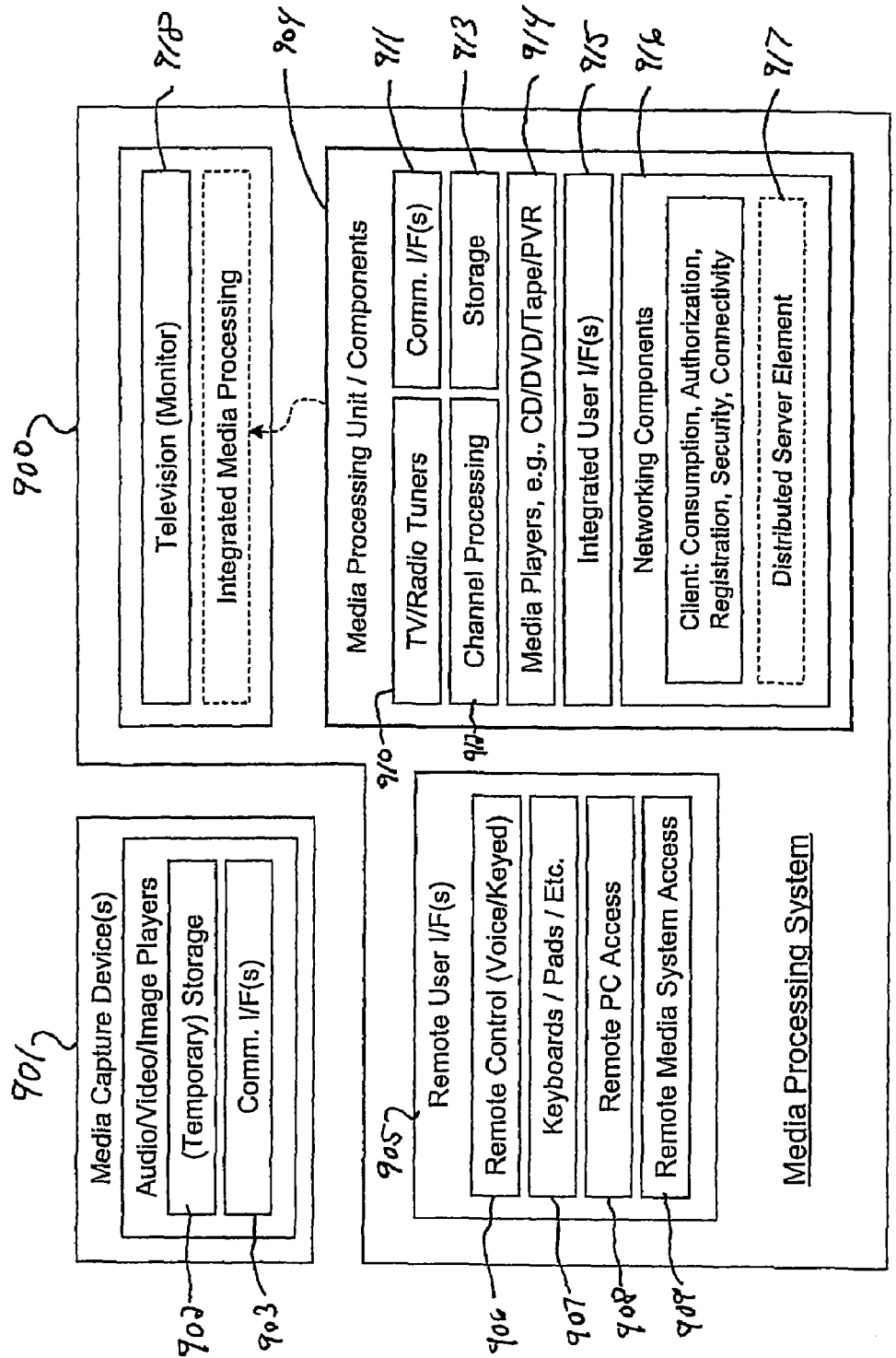
FIG. 9A is a schematic block diagram illustrating an embodiment of a media processing system (MPS) interfacing to media capture peripherals according to the present invention.

FIG. 9A illustrates some elements of a media processing system (MPS) 900 and media capture devices 901 in accordance with an embodiment of the present invention. The media capture devices 901 may comprise, for example, audio, video, and image players, such as digital cameras, digital camcorders, and MP3 players, that each may include, for example, a temporary storage area 902 and a communication interface 903 such as, for example, a wired interface (e.g., a USB interface) or a wireless interface. The media capture devices 901 may interface to an MPS and a PC.

The MPS 900 may comprise, for example, a media processing unit (MPU) 904, remote user interface(s) 905, and a TV screen 918 to provide integrated media processing capability and indirect user interface capability. The remote user interfaces 905 may comprise, for example, a voice or keyed remote control 906, keyboards and pads 907, a remote PC access interface 908, and a remote media system access interface 909 (e.g., providing access from another MPS).

The media processing unit (MPU) 904 may comprise, for example, TV and radio tuners 910 for image and audio consumption, communications interfaces 911, channel processing 912 (e.g., creating, storing, indexing, and viewing), storage 913, media players 914 (e.g., CD players, DVD players, tape players, PVRs, and MP3 players), an integrated user interface 915 (e.g., to provide a. TV channel guide look-and-feel), networking components 916 to provide client functions such as, for example, consumption (e.g., billing), authorization (e.g., using digital certificates and digital ID's), registration, security, and connectivity. In accordance with an embodiment of the present invention, the networking components 916 may include a distributed server element 917 that is part of a distributed server.

Figure 9B:
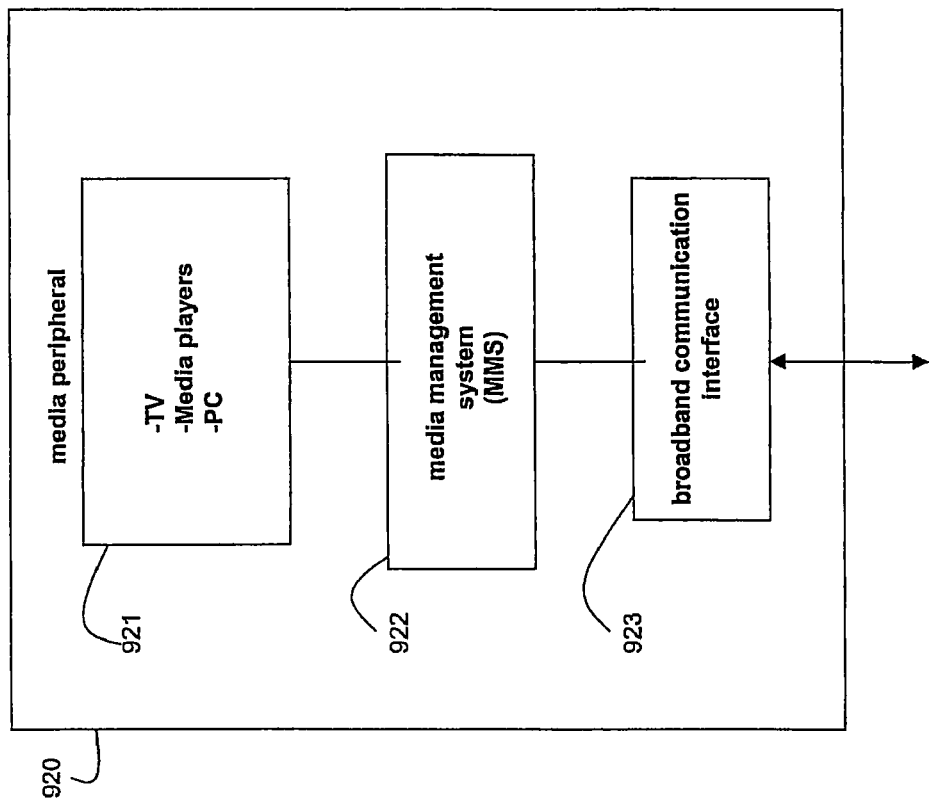
FIG. 9B illustrates an embodiment of an MPS according to the present invention.

FIG. 9B illustrates an embodiment of a media processing system (MPS) 920 in accordance with various aspects of the present invention. The MPS 920 may comprise, for example, an enhanced set-top box for viewing and interacting with various user interfaces, media, data and services that are available on the media exchange network using, for example, a remote control. The MPS 920 may comprise, for example, a media peripheral 921, a media management system (MMS) 922 and a broadband communication interface 923.

The media peripheral 921 may include, for example, a TV, a PC and media players (e.g., a CD player, a DVD player, a tape player and an MP3 player) for video, image and audio consumption of broadcast channels and/or personal channels. The broadband communication interface 923 may include, for example, internal modems (e.g., a cable modem or a DSL modem) or other interface devices to communicate with, for example, a cable or satellite headend.

The MIVIS 922 may include a software platform to provide functionality including, for example, media "push" capability, media "access" capability, media channel construction/selection, image sequence selection, text and voice overlay, channel and program naming, inter-home routing selection, authorship and media rights management, shared inter-home media experience, billing service and a media guide user interface providing an integrated TV channel guide look-and-feel.

Figure 10:
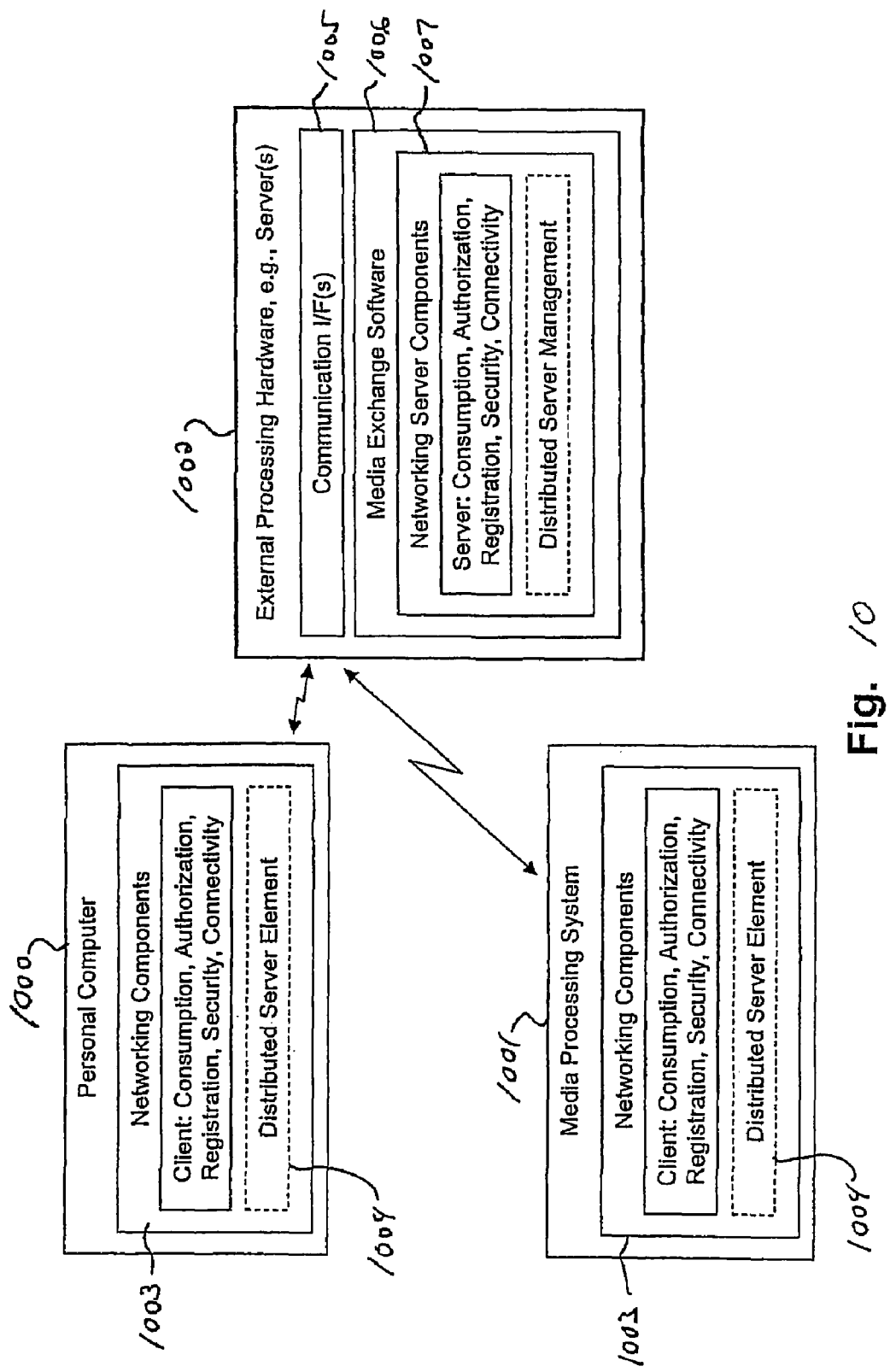
FIG. 10 is a schematic block diagram illustrating an embodiment of a personal computer (PC) and an MPS interfacing to a server on a media exchange network according to the present invention.

FIG. 10 illustrates connectivity between a PC 1000, an MPS 1001, and an external processing hardware 1002 (e.g., a server) in accordance with an embodiment of the present invention. The PC 1000 and the MPS 1001 may include networking components 1003 to provide client functions such as, for example, consumption (e.g., billing), authorization, registration, security, and connectivity. In accordance with various embodiments of the present invention, the PC 1000 and the MPS 1001 may include a distributed server element 1004 that is part of a distributed server.

The PC 1000 and the MPS 1001 may connect to the external processing hardware 1002 via wired connections or wireless connections in accordance with various embodiments of the present invention. The external processing hardware 1002 may comprise, for example, a distributed server or a peer-to-peer server. The external processing hardware 1002 also may comprise communication interfaces 1005 (e.g., cable interfaces, optical interfaces, etc.) and a media exchange software (MES) platform 1006. The MES platform 1006 in the external processing hardware 1002 may allow for communication with the PC 1000 and the MPS 1001 which may also use the same MES platform 1006. The external processing hardware 1002 may also include networking server components 1007 to provide the similar client functions such as, for example, consumption (e.g., billing), authorization, registration, security, and connectivity at the server side.

Figure 11:
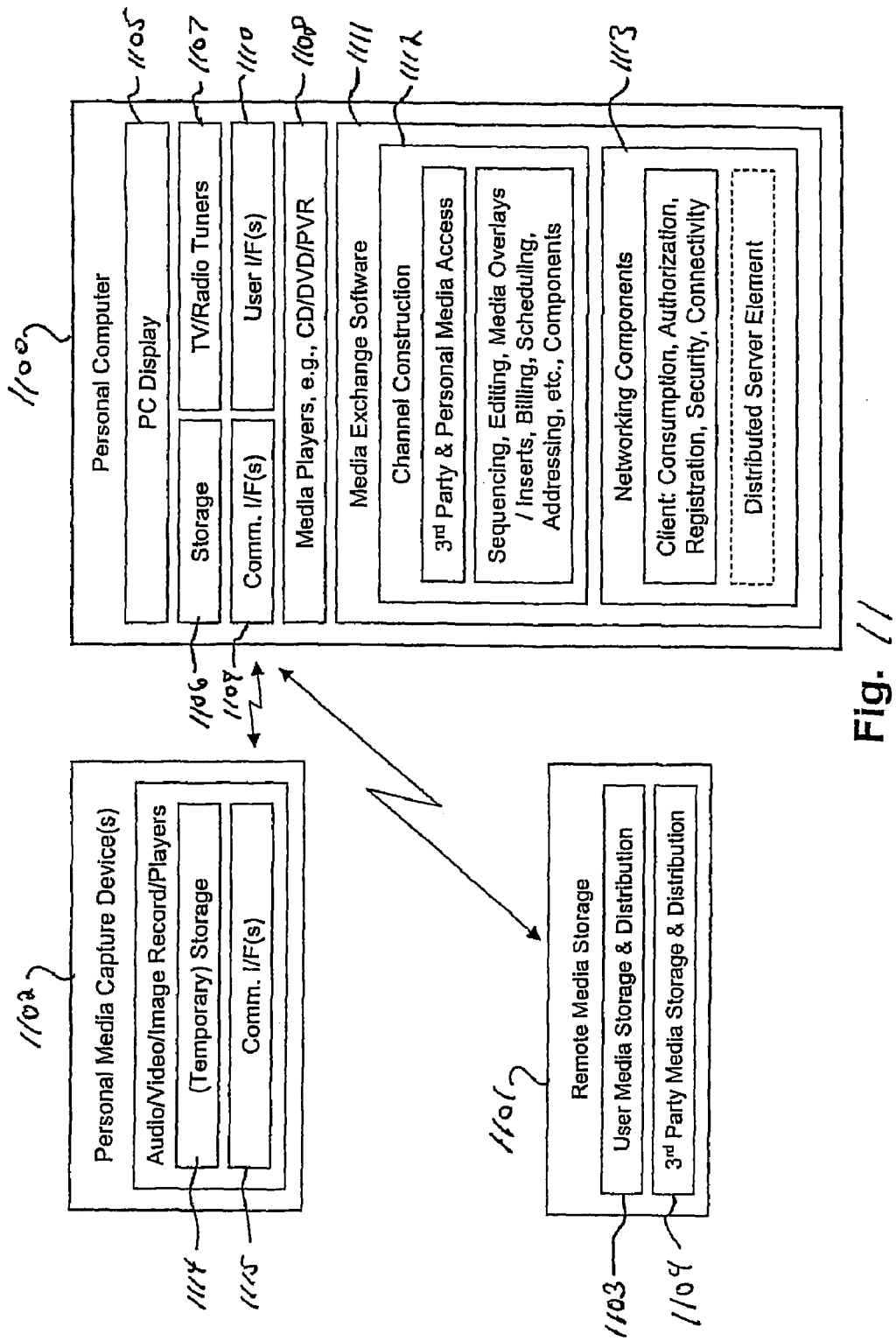
FIG. 11 is a schematic block diagram illustrating an embodiment of a PC interfacing to personal media capture devices and remote media storage on a media exchange network according to the present invention.

FIG. 11 illustrates connectivity between a PC 1100, a remote media storage 1101, and personal media capture devices 1102 when the PC 1100 is used as the primary distributor of digital media such as in the case of a PC-to-PC operation, in accordance with an embodiment of the present invention. The personal media capture devices 1102 and the remote media storage 1101 may connect to the PC 1100 via a wireless connection or a wired connection. The remote media storage 1101 may provide user media storage and distribution 1103 as well as third party media storage and distribution 1104. The personal media capture devices 1102 may provide temporary storage 1114 and communication interfaces 1115.

Viewing may be done using a PC monitor 1105 instead of a television screen in accordance with various embodiments of the present invention. The PC 1100 may include, for example, storage 1106, TV/radio tuners 1107 for media consumption, media players 1108, and communication interfaces 1109 and user interfaces 1110 similar to those for the MPS of FIG. 9. The PC 1100 may include a media exchange software (MES) platform 1111 that provides channel construction capability 1112 and networking capability 1113. The channel construction capability 1112 may provide, for example, third party and personal media access, sequencing, editing, media overlays and inserts, billing, scheduling, and addressing.

In summary, some embodiments of the present invention may relate to systems and methods that support adaptive media parameters on a media exchange network. Media parameters such as resolution, image size, audio quality, etc. may be adapted for certain media content to make the media content more compatible with end-user device capabilities.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing media content, comprising:
   receiving, at a second communications device communicatively coupled to a network at a first geographic location, from a first wireless mobile communications device communicatively coupled to the second communications device at the first geographic location, a device profile of the first wireless mobile communications device;
   sending the device profile, received from the first wireless mobile communications device, and media content to a server communicatively coupled to the network at a second geographic location;
   receiving media content from the server that has been reformatted based on the device profile; and
   transmitting the reformatted media content to the first wireless mobile communications device.

2. The method according to claim 1, comprising storing the received device profile of the first wireless mobile communication device.

3. The method according to claim 1, wherein the device profile of the first wireless mobile communication device is stored at the first wireless mobile communication device prior to the sending.

4. The method according to claim 1, comprising transcoding by the server, the media content from a first type of format to a second type of format, wherein the second type of format is compatible with the first wireless mobile communications device.

5. The method according to claim 1, wherein the server comprises a dedicated format conversion server.

6. The method according to claim 1, comprising requesting the media content from the second communications device.

7. The method according to claim 1, comprising updating the device profile.

8. The method according to claim 1, comprising communicatively coupling the first wireless mobile communications device to the network via a first headend, and communicatively coupling the second communications device to the network via a second headend.

9. The method according to claim 1, wherein one or more of the first wireless mobile communications device, the second communications device and/or the server comprises a software platform that can provide one or more of user-interface functionality, distributed storage functionality and/or networking functionality.

10. The method according to claim 1, wherein one or more of the first wireless mobile communications device, the second communications device and/or the server comprises a software platform that can provide one or more of device registration, channel setup, program setup, management and/or security.

11. The method according to claim 1, wherein one or more of the first wireless mobile communications device, the second communications device and/or the server is adapted to provide one or more of distributed networking capability, archival functionality, temporary storage capability, storage manager capability and/or digital rights manager capability.

12. The method according to claim 1, wherein the device profile comprises information related to media capabilities of the first wireless mobile communications device.

13. The method according to claim 1, wherein one or both of the first wireless mobile communications device and/or the second communications device comprises a television screen that facilitates viewing and interacting with one or more of a user interface, media, data, and/or services available on the network.

14. A method for reformatting media content, comprising:
   sending by a first wireless mobile communications device communicatively coupled to a network at a first geographic location, a device profile to a second communications device communicatively coupled to the network at the first geographic location, and receiving media content from the second communications device, wherein the media content has been reformatted by a server at a second geographic location based on the device profile.

15. The method according to claim 14, comprising storing the device profile of the first wireless mobile communication device.

16. The method according to claim 14, wherein the device profile of the first wireless mobile communication device is stored at the first wireless mobile communication device prior to the sending.

17. The method according to claim 14, comprising storing the device profile by the second communications device for use in reformatting other media content destined for the first wireless mobile communications device.

18. The method according to claim 14, comprising reformatting the media content from a first type of format to a second type of format, wherein the second type of format is compatible with the first wireless mobile communications device.

19. The method according to claim 14, wherein one or more of the server, the first wireless mobile communications device and/or the second communications device comprises a software platform that can provide one or more of user-interface functionality, distributed storage functionality and networking functionality, device registration, channel setup, program setup, management and security, distributed networking capability, archival functionality, temporary storage capability, storage manager capability and/or digital rights manager capability.

20. The method according to claim 14, wherein the device profile comprises information related to media capabilities of the first wireless mobile communications device, and wherein the device profile is updateable by the first wireless mobile communications device.

21. The method according to claim 14, wherein one or more of the server, the first wireless mobile communications device and/or the second communications device comprises a television screen that facilitates viewing and interacting with one or more of a user interface, media, data, and/or services available on the network.

22. A method for processing media content, comprising:
receiving at a second communications device communicatively coupled to the network at a first geographic location, from a first wireless mobile communications device communicatively coupled to the second communications device at the first geographic location, a device profile of the first wireless mobile communications device;
sending a request for media content to a server communicatively coupled to the network at a second geographic location;
receiving the requested media content from the server;
reformatting the received media content based on the device profile; and
transmitting the reformatted media content to the first wireless mobile communications device.

23. The method according to claim 22, wherein the second communications device comprises a set-top box (STB).

24. The method according to claim 22, comprising storing by the second communications device, the device profile of the first wireless mobile communication device after the receiving.

25. The method according to claim 22, comprising storing the device profile of the first wireless mobile communication device at the first wireless mobile communication device prior to the receiving.

26. The method according to claim 22, comprising transcoding the media content from a first type of format to a second type of format, wherein the second type of format is compatible with the first wireless mobile communications device.

27. The method according to claim 22, wherein the server comprises a dedicated format conversion server.

28. The method according to claim 22, comprising requesting by the first wireless mobile communications device, the media content from the second communications device.

29. The method according to claim 22, comprising updating the device profile.

30. The method according to claim 22, communicatively coupling the first wireless mobile communications device to the network via a first headend, and communicatively coupling the second communications device to the network via a second headend.

31. The method according to claim 22, wherein one or more of the first wireless mobile communications device, the second communications device and/or the server comprises a software platform that can provide one or more of user-interface functionality, distributed storage functionality and/or networking functionality.

32. The method according to claim 22, wherein one or more of the first wireless mobile communications device, the second communications device and/or the server comprises a software platform that can provide one or more of device registration, channel setup, program setup, management and/or security.

33. The method according to claim 22, wherein one or more of the first wireless mobile communications device, the second communications device and/or the server is adapted to provide one or more of distributed networking capability, archival functionality, temporary storage capability, storage manager capability and/or digital rights manager capability.

34. The method according to claim 22, wherein the device profile comprises information related to media capabilities of the first wireless mobile communications device.

35. The method according to claim 22, wherein one or both of the first wireless mobile communications device and/or the second communications device comprises a television screen that facilitates viewing and interacting with one or more of a user interface, media, data, and/or services available on the network.

36. A method for reformatting media content, comprising:
sending by a first wireless mobile communications device communicatively coupled to a network at a first geographic location, a device profile to a second communications device communicatively coupled to the network at the first geographic location, and receiving media content from the second communications device, wherein the media content has been reformatted, based on the device profile, by the second communications device after receipt of the media content by the second communications device via the network from a server at a second geographic location.

37. The method according to claim 36, wherein the second communications device comprises a set-top box (STB).

38. The method according to claim 36, wherein the second communications device stores the device profile of the first wireless mobile communication device.

39. The method according to claim 36, comprising storing the device profile of the first wireless mobile communication device at the first wireless mobile communication device.

40. The method according to claim 36, comprising storing the device profile by the second communications device, for use in reformatting other media content destined for the first wireless mobile communications device.

41. The method according to claim 36, comprising reformatting by the second communications device, the media content from a first type of format to a second type of format, wherein the second type of format is compatible with the first wireless mobile communications device.

42. The method according to claim 36, wherein one or more of the server, the first wireless mobile communications device and/or the second communications device comprises a software platform that can provide one or more of user-interface functionality, distributed storage functionality and networking functionality, device registration, channel setup, program setup, management and security, distributed networking capability, archival functionality, temporary storage capability, storage manager capability and/or digital rights manager capability.

43. The method according to claim 36, wherein the device profile comprises information related to media capabilities of the first wireless mobile communications device, and wherein the device profile is updateable by the first wireless mobile communications device.

44. The method according to claim 36, wherein one or more of the server, the first wireless mobile communications device and/or the second communications device comprises a television screen that facilitates viewing and interacting with one or more of a user interface, media, data, and/or services available on the network.

* * * * *